Inventor
RONALD HINDS

United States Patent Office 3,556,904
Patented Jan. 19, 1971

3,556,904
APPARATUS FOR CONTROLLING TENSION IN TAPE MATERIAL BEING DRAWN OFF FROM A PAD
Ronald Hinds, Woolton, Liverpool, England, assignor to British Insulated Callender's Cables Limited, London, England
Filed Mar. 7, 1967, Ser. No. 621,287
Claims priority, application Great Britain, Mar. 9, 1966, 10,394/66
Int. Cl. B31c 1/08; B65g 35/00, 49/00
U.S. Cl. 156—425                                 11 Claims

ABSTRACT OF THE DISCLOSURE

Tension regulating apparatus for applying a retarding force to a tape being drawn from a pad which is mounted for rotation about its axis against a constant braking torque applied to the pad comprises a rotatably adjustable base on which are mounted two parallel non-rotatable cylindrical pins over the surfaces of which the tape can be drawn in opposite directions to generate frictionally a force tending to retard the passage of the tape. A spring loaded control arrangement responsive to variations in the tension in the tape after it leaves the apparatus and to variations in the spring loading so controls the angular position of the pin base relative to a datum position that the aggregate arc of contact between the tape and the pins is automatically adjusted to compensate for any variations tending to occur in the tension in the tape being drawn off from the pad.

---

This invention relates to apparatus for regulating the tension in tape material being drawn off from a convolute roll or a spirally wound disc of the material (hereinafter termed a "pad") mounted for rotation about its axis. More especially but not exclusively it is concerned with tension regulating apparatus for use in machines for lapping paper or other tape helically about a longitudinally advancing elongated body, for instance an electric conductor or cable (hereinafter termed a "core"), in which machines the tapes of paper or other material are drawn off from pads which are rotatably mounted on supporting spindles.

It is the usual practice in such machines to maintain the tape under tension as it is drawn off a pad by applying a retarding torque to the pad or its support. If this retarding torque is maintained constant then, as the diameter of the pad decreases as tape is drawn off, the tension required to draw off the tape gradually increases. To maintain approximately constant tension by automatically continuously reducing the value of the braking torque applied to the pad involves a complicated and expensive control mechanism. The rise in tension can be lessened without resort to such complicated control mechanism by applying a constant retarding torque to the pad and its support, the resulting tension from which can be modified automatically to maintain it at a substantially constant value as the diameter of the pad becomes smaller.

One known form of apparatus for carrying out this latter method comprises two parallel non-rotatable cylindrical pins over the surface of which tape can be drawn from a pad to generate frictionally a force tending to retard the movement of the tape. The pins are so disposed that the tape can pass from the pad around one pin in one direction and from that pin around the other pin in the opposite direction, one pin being planetarily adjustable about the other pin. An arrangement responsive to changes in the diameter of the pad is provided which so controls the angular position of the planetary pin in relation to the other pin that the aggregate arc of contact between the tape and pins will be automatically reduced as the pad diameter decreases. Whilst by means of this known form of apparatus the final tension in the tape can be regulated in relation to changes in the diameter of the pad the apparatus is insensitive to any variations that might occur in the actual tension in the tape due to other causes.

The present invention provides improved apparatus for applying a retarding force to a tape being drawn from a pad which is mounted for rotation about its axis against a constant braking torque applied directly or indirectly to the pad, which apparatus permits a gradual variation in the retarding force applied to the tape to be effected by means directly responsive to variations in the tension in the tape.

In accordance with the invention the improved apparatus comprises two parallel non-rotatably cylindrical pins over the surfaces of which the tape can be drawn to generate frictionally a force tending to retard the passage of the tape. The pins are mounted on a base common to both pins and rotatably adjustable about an axis extending parallel and in close proximity to the pins and the pins are so disposed that the tape can pass from the pad in one direction around one pin and from that pin in the opposite direction around the other pin. A spring loaded control arrangement responsive to variations in the tension in the tape after it leaves the apparatus and to variations in the spring loading is also provided so to control the angular position of the pin base relative to a datum position that the aggregate arc of contact between the tape and the pins will be automatically adjusted to compensate for any variations tending to occur in the tension in the tape being drawn off from the pad due to decrease in pad diameter or to other causes.

It is preferred to arrange for the base on which the pins are mounted to be rotatable about an axis co-planar with the axes of the pins. The base axis preferably lies midway between the pin axes. At the base is rotatably adjusted about its axis the arc of contact between the tape and each pin changes in the same sense. That is to say when the base supporting the pins is rotated in one direction from one extreme position through an angle of less than 180° to a second extreme position the arcs of contact decrease and when rotated in the converse direction through such an angle the arcs of contact increase. In this way the aggregate angle of lap of the tape around the two pins may be varied over a wide range. By co-relating the angular movement of the base supporting the pins with variations tending to occur in the tension in the tape leaving the pin assembly, the effective tension in the tape can be maintained more nearly constant. In the optimum condition the effect of the improved apparatus is such that the tension generated by the passage of the tape over the pins varies in response to any variations in the tape leaving the pin assembly that are measured by the control arrangement.

Preferably the spring loaded control arrangement is coupled to the pin base and is actuated by a dancer roller about which the tape passes after it leaves the pin assembly. Thus as the diameter of the pad decreases and the tension in the tape tends to increase the dancer roller is caused to move against the action of its spring loading.

Preferably also means are provided for varying the torque exerted on the base by the control arrangement as it responds to variations in the tension in the tape by automatically modifying in a predetermined manner the value of the spring loading. It is preferred to modify automatically the spring force exerted on the control arrangement as it responds to variations in the tension in the tape by coupling the control arrangement to a coil spring exerting such spring force by a cable assembly adapted to co-operate with a cam having such a profile that, for any angular movement of the base caused by movement of the danger roller, the force exerted on the control arrangement by the coil spring results in correct angular adjustment of the pin base required to maintain the tension in the tape substantially constant irrespective of pad radius.

It is to be understood that where the context permits the term "cable assembly" as used in this specification and in the claims which form part thereof is intended to include an assembly of cables, claims or any other suitable elongated flexible members or a combination of two or more such flexible members.

Where the improved tension regulating apparatus is to be used in applications where hunting of the control arrangement is likely to occur to an undesirable extent a suitable damping device may be coupled to the control arrangement and/or pin base.

The invention will now be described in more detail, and by way of example, as applied to a machine for lapping tape helically about a longitudinally advancing core which machine has at least one lapping head having six outwardly extending arms on each of which is mounted for rotation a pair of pads of tape. In the accompanying drawings:

Figure 1:
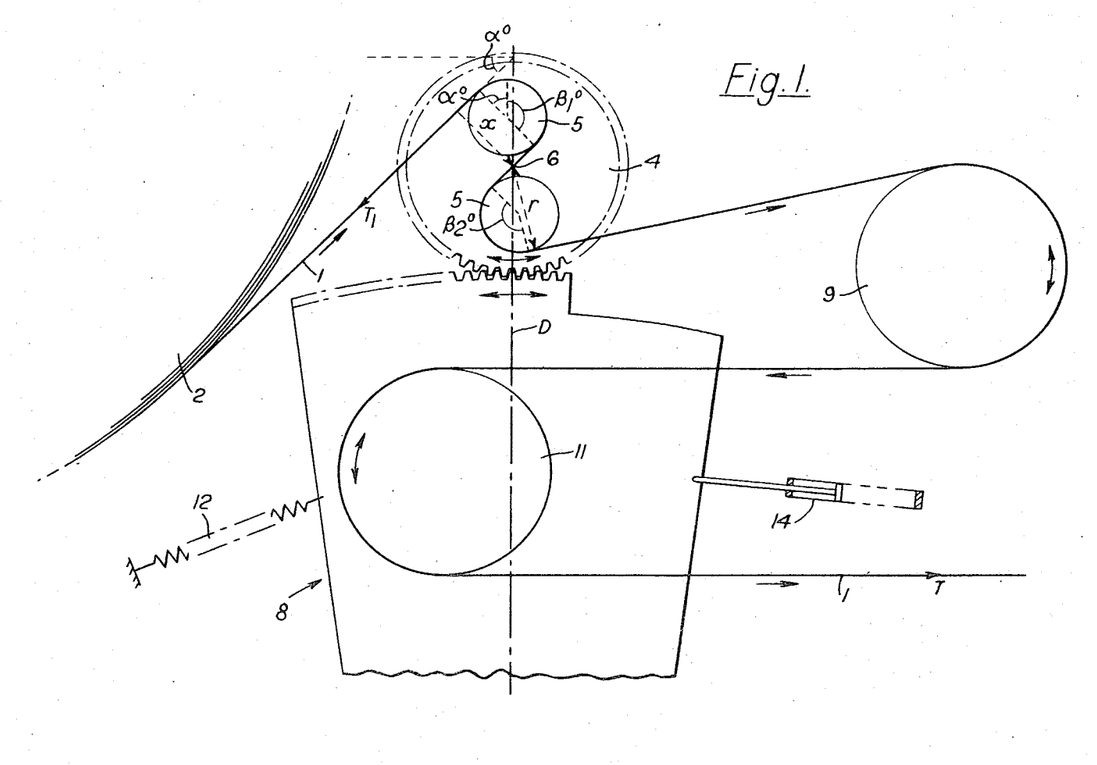
FIG. 1 is a diagram illustrating the path of the tape being drawn off from a pad and passing through tension regulating apparatus in accordance with the invention which is associated with said pad.

The tension regulating apparatus shown diagrammatically in FIG. 1 comprises two parallel, non-rotatable cylindrical pins 5 mounted on a base 4 which is common to both pins and which is rotatably adjustable about an axis 6 co-planar with and extending parallel to and midway between the axes of the pins, and a spring loaded control arrangement 8 comprising a fixed roller 9, an arm 10 pivoted at one end (not shown) about an axis parallel to the pin axes and geared at its other end to the pin base 4, a dancer roller 11 mounted on the arm and spring means 12 for exerting a torque on the arm 10. The pins 5 are so disposed that tape 1 being drawn off from a pad 2 passes in one direction around one pin and from that pin in the opposite direction around the other pin to generate frictionally a force tending to retard the passage of the tape and, from the pin assembly the tape passes around the fixed roller 9 in one direction and from the fixed roller in the opposite direction around the dancer roller 11 from which it is then guided to the longitudinally advancing core (not shown). As will be seen from the diagram the tension T in the tape 1 leaving the tension regulating apparatus exerts a torque on the arm 10 in the opposite sense to that exerted by the spring means 12 to cause the arm to pivot against the action of its spring loading as the diameter of the pad 2 decreases and the tension T in the tape tends to increase. The control arrangement 8 is responsive to variations in the tension T and to variations in the spring loading so to control the angular position of the pin base 4 relative to a datum position that the aggregate arc of contact between the tape 1 and the surfaces of the pins 5 will be automatically adjusted to compensate for any variations tending to occur in the tension T due to decrease in diameter of the pad 2 or to other causes.

For any radius of pad 2 the aggregate arc of contact is the angular sum of the pad angle $\alpha$ (that is the angle which the tape 1 leaving the periphery of the pad makes with a plane normal to a datum plane D) and the sum of the angles of contact $\beta_1$ and $\beta_2$ between the tape and the two pins 5 measured from a point on the surface of the first pin lying on a radius that is parallel to the datum plane. By the term "datum plane" is meant a plane containing the axes of the pins 5 when the pin base 4 lies in a predetermined datum position. In the preferred form of apparatus now being described by way of example, it is preferred to arrange for the datum position of the pin base 4 to be such that the datum plane D is inclined at an angle of about 42° to the plane containing that length of tape 1 extending between the periphery of a pad of 9 inches radius and the first pin.

When the tape 1 passes between the pins 5 without contacting the surfaces of the pins the tension $T_1$ in the tape on the pad side of the pin assembly will obviously be equal to the tension T in the tape leaving the tension regulating apparatus. For a given braking torque applied to the pad 2 the force necessary to pull the tape 1 off the pad will be P.T. where P is the radius of the pad at which the tape passes freely between the pins 5. Since the braking torque applied to the pad 2 is maintained constant the pull-off force remains constant. Therefore for any pad radius R $$T_1 = \frac{P}{R} \cdot T$$

since $$\frac{T_1}{T} = e^{\mu \theta}$$

where $\mu$ is the coefficient of friction between the tape 1 and the pins 5 and $\theta$ is the aggregate arc of contact between the tape and the surfaces of the pins, it follows that $$\frac{P}{R} = e^{\mu \theta} \qquad (i)$$

Figure 2:
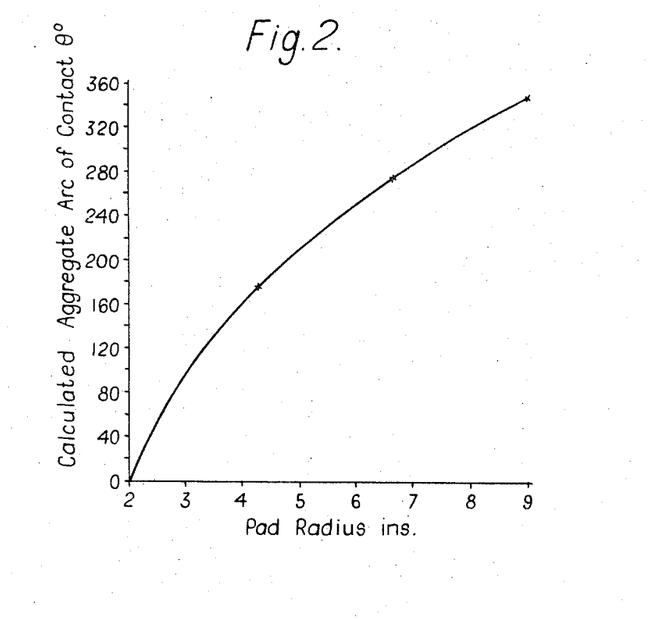
FIGS. 2 to 7 are graphical representations used to determine the conditions of the tension regulating apparatus that are necessary in order to maintain the tension in the tape leaving the apparatus and being lapped about the advancing core substantially constant.

By use of Equation i it is possible to plot graphically, for constant tension conditions, the calculated aggregate arc of contact $\theta$ that is necessary between the tape 1 and the two pins 5 against pad radius R and this graph, for the tension regulating apparatus now being described where $P = 2$ inches, is shown in FIG. 2.

Figure 3:
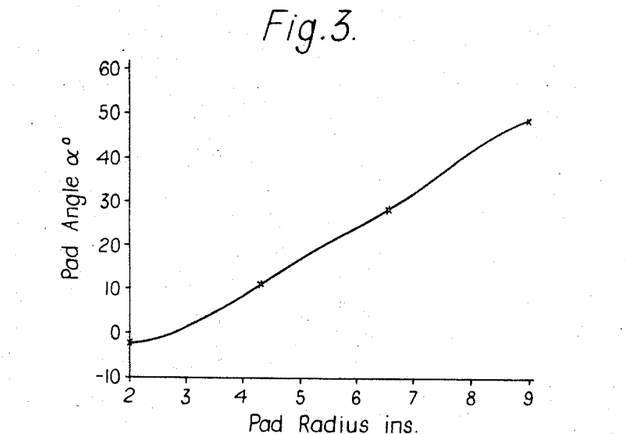
Figure 4:
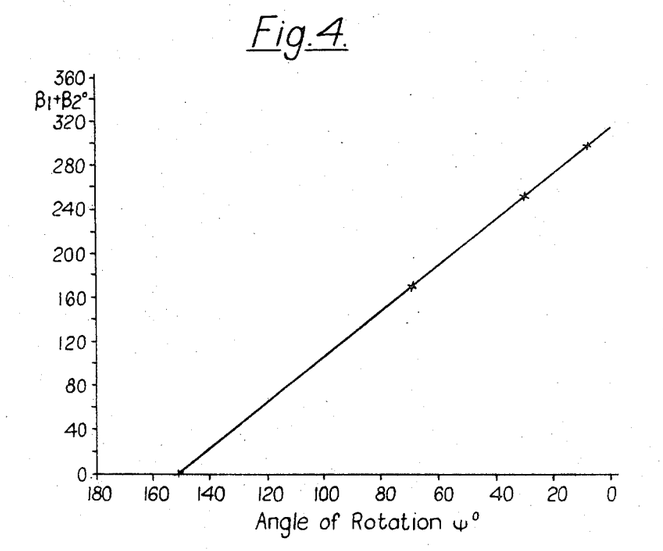

By also graphically plotting (1) the pad angle against pad radius R as shown in FIG. 3, and (2) the sum of the two angles of contact $\beta_1$ and $\beta_2$ between the tape 1 and the two pins 5 measured from a point on the surface of the first pin lying on a radius that is parallel to the datum plane against angular movement $\psi$ of the pin base 4 from this datum position as shown in FIG. 4, it is possible to derive, using the graph shown in FIG. 2, a curve showing for any radius of the pad 2 the angular position of the pin base 4 required to maintain a given tension in the tape 1. For example, from the graph shown in FIG. 2 it will be seen that for a pad radius of 6.66 inches the value of the calculated aggregate arc of contact $\theta$ necessary between the tape 1 and the two pins 5 for constant tension conditions is 277°. From the curve shown in FIG. 3 the pad angle $\alpha$ for a pad radius of 6.66 inches is 28°. Therefore the sum of the two angles of contact $\beta_1$ and $\beta_2$ must be equal to 277°−28°=249°. From the curve shown in FIG. 4 it will be seen that for the sum of $\beta_1$ and $\beta_2$ to be 249° the angular movement $\psi$ of the pin base 4 from the datum position is 30°. A table showing the angular movement $\psi$ for various pad angles is given below

| R inches | $\theta°$ | $\alpha°$ | $\beta_1+\beta_2°$ | $\psi°$ |
|---|---|---|---|---|
| 9 | 345 | 48 | 297 | 7 |
| 6.66 | 277 | 28 | 249 | 30 |
| 4.33 | 178 | 11 | 167 | 70 |
| 2 | 0 |  | 0 | 150 |

Figure 5:
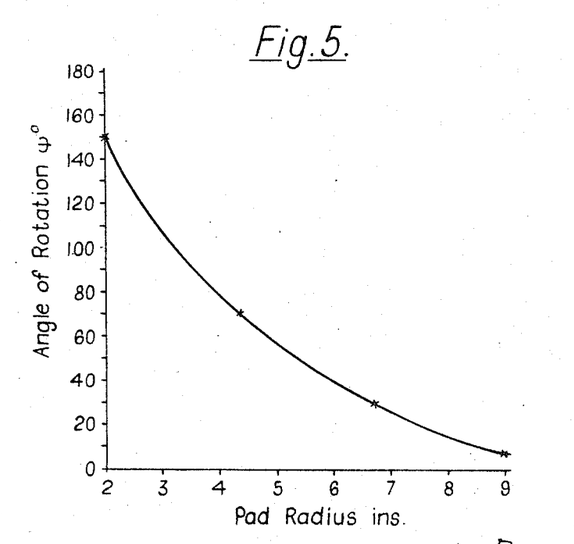

The curve showing for any radius R of the pad 2 the angular movement $\psi$ of the pin base 4 required to maintain a given tension in the tape 1 can be drawn from the figures in the above table and is shown in FIG. 5.

The torque $t$ exerted on the pin base 4 by the spring loaded control arm 10 is given by the expression:

$$t = (T_1 x + Tr)K + 2Ty \qquad (ii)$$

where $x$ is the perpendicular distance between the tape 1 being led to the first pin and the axis about which the pin base 4 is rotatable, $r$ is the perpendicular distance between the tape being led from the second pin and the base axis, K is the gear ratio and $y$ is the distance between the axis of the dancer roller 11 mounted on the arm 10 and the pivoting axis (not shown) of the arm.

Since $$T_1 = \frac{P}{R} \cdot T$$

$$t = \left(\frac{P}{R} \cdot Tx + Tr\right)K + 2Ty$$

then substituting for $T_1$ in Equation ii $$= T\left\{\left(\frac{Px}{R} + r\right)K + 2y\right\} \qquad (iii)$$

From Equation iii it is possible to calculate, for any pad radius R, the torque $t$ exerted on the pin base 4 by the spring loaded control arm 10 in terms of the tension T in the tape 1 leaving the tension regulating apparatus. In the tension regulating apparatus now being described $P=2$ inches, $K=8$, $y=2.5$ inches and $x$ and $r$ can be simply determined by scale drawing or by calculation. A table giving the torque $t$ for various pad radii is given below

| R inches | $x$ inches | $r$ inches | $t$ |
|---|---|---|---|
| 9 | 0.344 | 0.406 | 8.86T |
| 6.66 | 0.406 | 0.375 | 8.97T |
| 4.33 | 0.297 | 0.282 | 8.35T |
| 2 |  |  | 5T |

Figure 6:
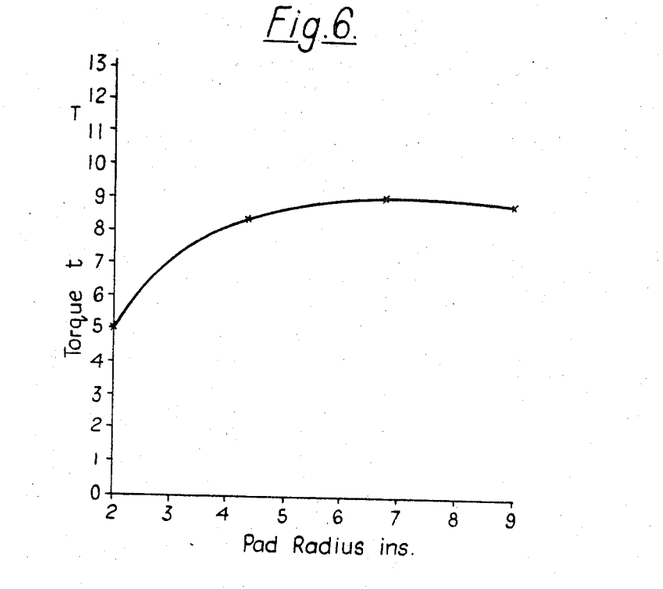

The curve of the torque $t$ in terms of T against the pad radius R is shown in FIG. 6. From the curve shown in FIG. 6 and the curve in FIG. 5 showing the angular movement $\psi$ of the pin base 4 plotted against pad radius R, it is possible to derive, for a given tension in the tape 1, a graph showing the relationship between the control arm torque $t$ in terms of the tension T and the angular movement $\psi$ of the pin base 4. This curve is shown in FIG. 7.

Figure 7:
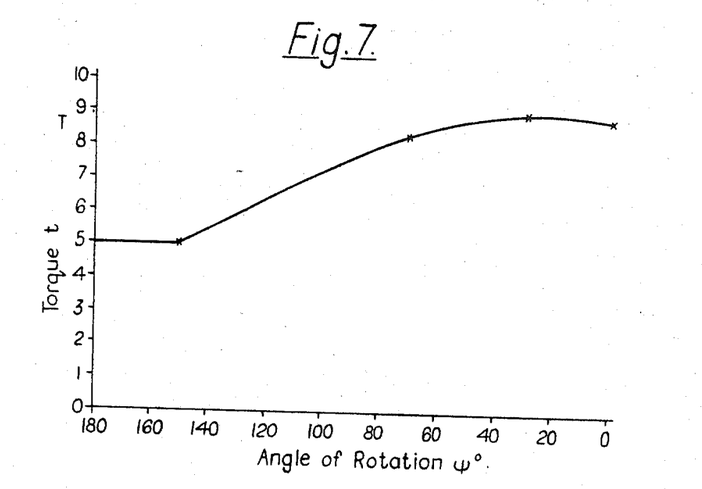
Figure 8:
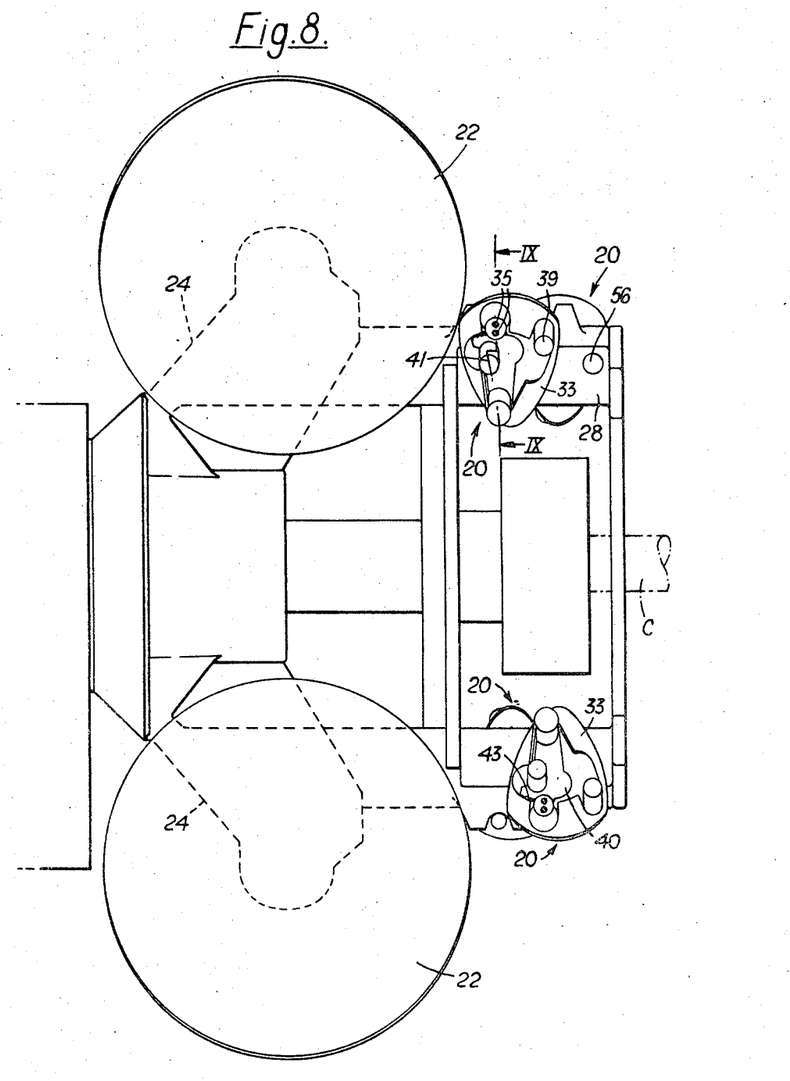
FIG. 8 is a fragmental side elevation of a revolving lapping head of the machine with all but two diagonally opposed pairs of pads omitted.
Figure 9:
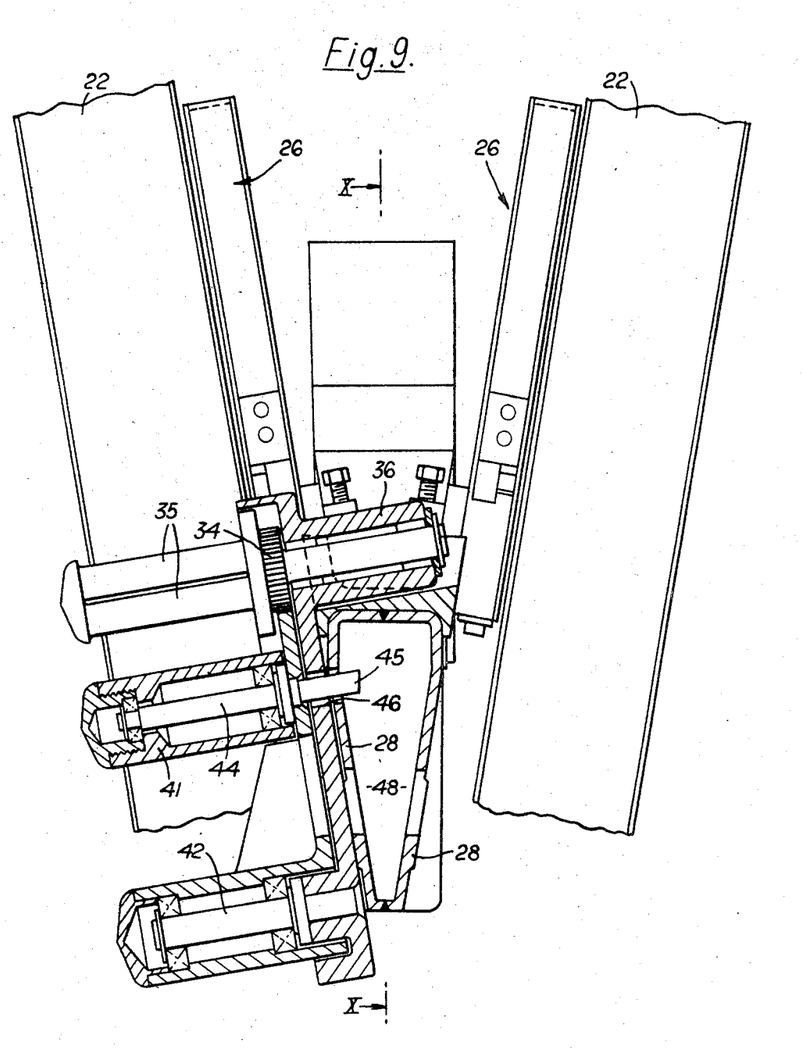
FIG. 9 is a section taken on the line IX—IX in FIG. 8 drawn on an enlarged scale as compared with that of FIG. 8.

From the curve shown in FIG. 7 it will be seen that, in order to maintain the tension T in the tape 1 leaving the tension regulating apparatus substantially constant as the diameter of the pad 2 decreases and the spring loaded arm 10 pivots to effect the necessary angular movement of the base 4 and adjust the aggregate arc of contact between the tape and the pins 5, the torque $t$ exerted by the spring loaded arm on the pin base should increase slightly for the first approximately 20° of rotation of the base from the datum position and should then gradually diminish to a minimum value as the angle of rotation of the base increases. Consequently the means for varying the torque $t$ exerted on the pin base 4 by the arm 10 as the arm pivots in response to variations in the tension in the tape 1 must be designed to effect automatically a slight increase in the force exerted on the arm by its spring means 12 for the first approximately 20° rotation of the base followed by a gradual decrease in this spring force as the angle of rotation $\psi$ of the base increases.

As previously stated a coil spring is preferably employed to exert the spring force on the arm 10 as the arm pivots in response to variations in the tension in the tape 1 and this coil spring is preferably coupled to the arm by a cable assembly adapted to co-operate with a cam. The cam profile is so shaped that, for any angular movement of the pin base 4 caused by pivotal movement of the arm 10, the force exerted on the arm by the coil spring results in correct angular adjustment of the base required to maintain the tension in the tape 1 substantially constant irrespective of pad diameter. This cam shape can be determined by making use of the graphical relationship shown in FIG. 7 between the torque $t$ to be exerted by the control arm and the angular movement of the pin base 4 relative to a datum position.

Where hunting of the control arrangement is likely to occur to an undesirable extent a suitable damping device 14 may be coupled to the control arm. Additional or alternative damping means (not shown) may be coupled to the rotatably adjustable pin base 4.

Although bearing friction due to centrifugal forces on a pad and its supporting parts can be taken into consideration when deriving curves showing the angular movement of the pin base 4 required to maintain a given tension in a tape for pads of tapes of different widths and when plotting control arm torques against pad radii for such pads, it has been found from the derived graphical relationship between control arm torque and angular movement of the pin base that such bearing friction has a negligible effect on the control arm system and can be ignored.

Referring now to FIGS. 8 to 12 illustrating a revolving lapping head of a machine for lapping tape helically about a longitudinally advancing core, the lapping head has six outwardly extending arms 24 uniformly distributed around the head on each of which is mounted for rotation a pair of pads 22 of tape 21, each pad of a pair on one of a pair of spindles supported by and projecting laterally from opposite sides of one of the arms. In applying the present invention to such a lapping head each pad 22 has associated therewith a band brake 26 for applying a constant braking torque of preselected value to the pad and a separate tension regulating apparatus 20 in accordance with the present invention. For the sake of clarity in FIG. 8 all but two diagonally opposed pairs of pads 22 and their associated tension regulating apparatus have been omitted. A pair of arms 28 secured one on each side of and spaced from each outwardly projecting arm 24 of the head extend parallel to and in the direction of advance of a core C and form a supporting structure for the tension regulating apparatus 20 of each pad 22 of the pair of pads, the pin assembly 31 and control arm 40 of the tension regulating arrangement for one pad of the pair being mounted on a plate 33 secured to the outer side face of one longitudinally extending arm 28 near its free end and the pin assembly and control arm of the tension regulating apparatus for the other pad of the pair being mounted on a plate 33 secured to the outer side face of the other longitudinally extending arm. Each plate 33 also supports a fixed roller 39 around which the tape 21 passes in one direction on leaving the pin assembly 31.

The pin assembly 31 of each tension regulating apparatus 20 (FIGS. 8 and 9) comprises two parallel nonrotatable cylindrical pins 35 mounted on a toothed wheel 34 carried by a rotatably adjustable spindle 36 whose axis extends parallel to and midway between the pins.

The control arm 40 is pivoted at one end about a fixed spindle 42 (FIG. 9) parallel to the pin axes and the other end of the arm is in the form of a toothed quadrant 43 which is in engagement with the toothed wheel 34 of the pin assembly. A dancer roller 41, which is rotatable about a fixed spindle 44, is mounted on the arm 40 with the spindle axis parallel to the pin axes, the tape 21 leaving the fixed roller 39 passing around the dancer roller 41 in the opposite direction. An extension 45 of the fixed spindle 44 of the dancer roller 41 protrudes through coinciding arcuate shaped slots 46 in the plate 33 and in the longitudinally extending arm 28 into the space 48 between the longitudinally extending arms.

Figure 10:
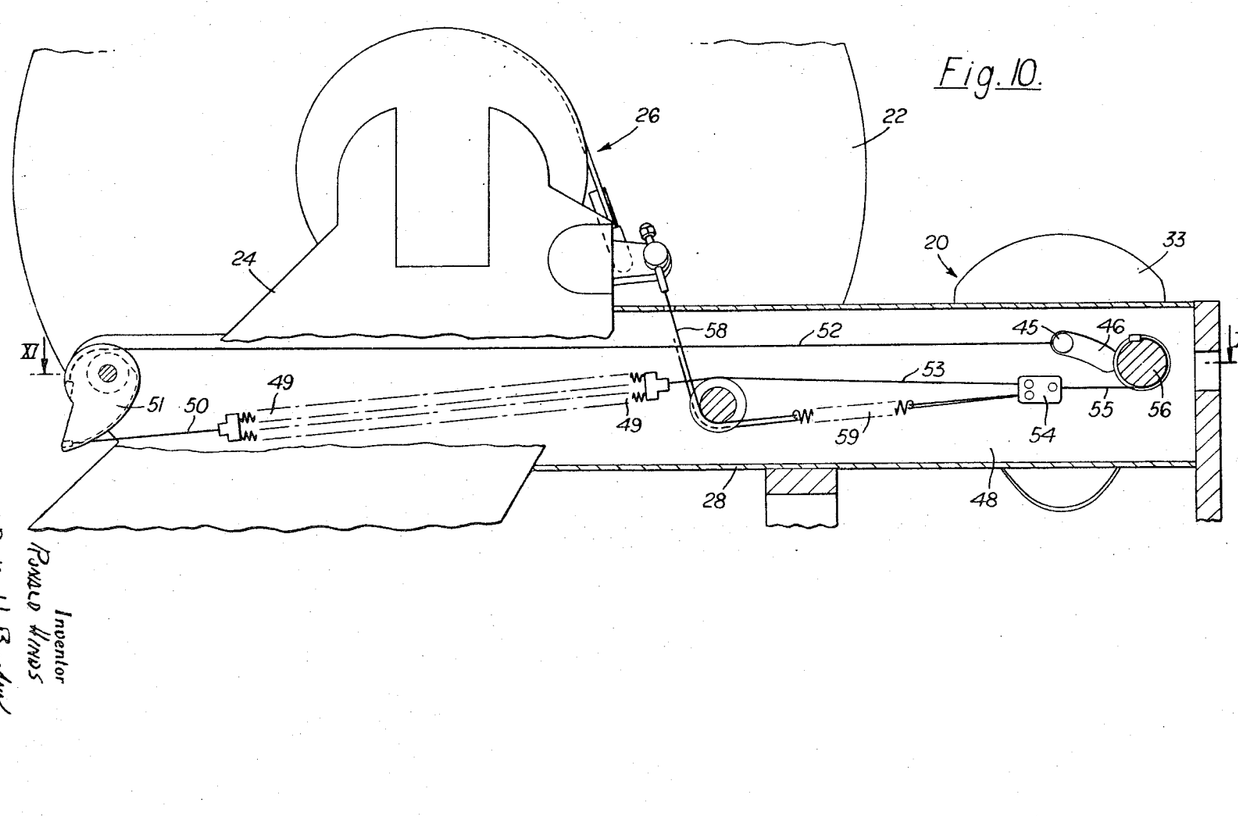
FIG. 10 is a section taken on the line X—X in FIG. 9 drawn on a reduced scale as compared with that of FIG. 9 showing the spring loaded control arrangement of the tension regulating apparatus of one pad of a pair of pads.

The spring loaded control arrangement of the tension regulating apparatus 20 of each pad 22 of a pair of pads comprises a pair of coil springs 49 connected in parallel and located in the space 48 between the outwardly projecting arms 24 and between the longitudinally extending arms 28, which springs exert on the control arm 40 a torque in a sense opposite to that exerted on the arm by the tension in the tape 21 leaving the tension regulating apparatus. From one end of the pair of springs 49 a chain 50 extends towards and is clamped to a cam 51 at one end of the cam profile which is of predetermined shape, the cam being rotatably mounted at the end of the axially extending arm 28 remote from the pin assembly 31 and control arm 40. A second chain 52 is clamped to the other end of the cam profile and extends towards and is anchored to the extension 45 of the fixed spindle 44 of the dancer roller 41 which projects through the arcuate slots 46 into the space 48. The other end of the pair of springs 49 is connected by a chain 53 to an anchorage block 54 which is connected by a further chain 55 to a control drum 56 for initially pre-setting the tension in the springs 49. The cam profile is so shaped that the effective moment of the spring force about the cam axis results in correct angular adjustment of the toothed wheel 34 required to maintain tension in the tape 21 substantially constant irrespective of the radius of the pad 22. As previously mentioned the shape of the cam profile may be determined by making use of the graphical relationship shown in FIG. 7.

The band of the band brake 26 applying constant braking torque to the pad 22 is connected by chains 58 through a coil spring 59 to the same anchorage block 54 to which the pair of parallel disposed coil springs 49 are connected. Thus the torques due to the coil springs 49 of the control arm 40 and to the coil spring 59 of the band brake 26 are related and can be initially adjusted for any tension within a limited range of tensions, for example to accommodate tapes of different widths, by presetting the control drum 56.

Figure 11:
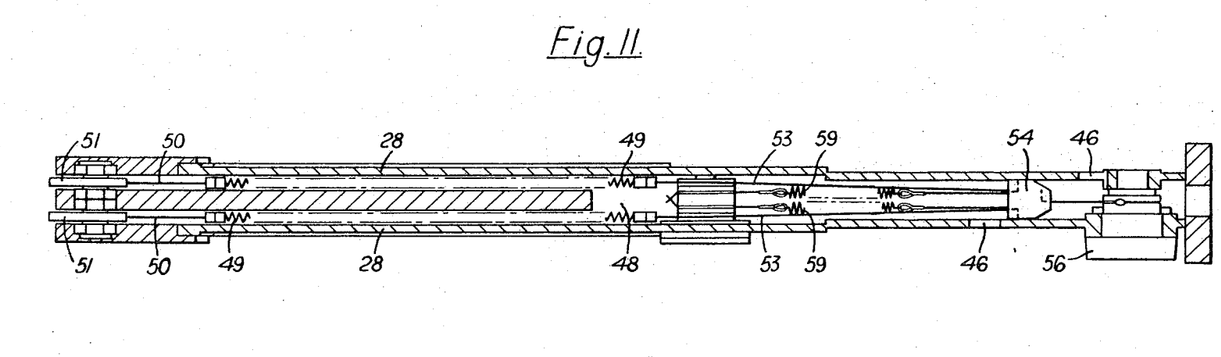
FIG. 11 is a section taken on the line XI—XI in FIG. 10, showing parts of the spring loaded control arrangements of the tension regulating apparatus of each pad of a pair of pads.

Where, as in the present example, the pads 22 of a pair of pads are of similar tape of the same width the pair of parallel disposed coil springs 49 of the tension regulating apparatus 20 and the coil spring 59 of the band brake 26 of each pad of the pair of pads will, as shown in FIG. 11, normally be connected to a single anchorage block 54 which will be connected by the chain 55 to a single control drum 56. In this way the spring system of the tension regulating apparatus 20 and the spring system of the hand brake 26 of each pad 22 of the pair of pads are controlled by the same control drum 56 since the tension required in the tape of each pad will be the same.

In operation as the diameter of each pad 22 decreases and the tension T in the tape 21 leaving the tension regulation apparatus 20 tends to increase the tape passing around the dancer roller 41 carried by the control arm 40 will cause the control arm to pivot against the action of its coil springs 49. The force exerted on the control arm 40 by the coil springs 49 will be automatically modified as the control arm pivots due to co-operation between the cam 51 and chain assembly of the arm so that the resultant angular movement imparted to the toothed wheel 34 to adjust the aggregate arc of contact between the tape 21 and the pins 35 will be such as to maintain the tension T in the tape leaving the tension regulating apparatus 20 substantially constant. If any variations tend to occur in the tension T in the tape 21 due to other causes the control arm 40 will pivot in the appropriate direction to cause the necessary adjustment of the aggregate arc of contact between the tape and the pins 35 to be made to maintain the tension in the tape substantially constant.

What I claim as my invention is:

1. Apparatus for applying a retarding force to a tape being drawn from a pad which is mounted for rotation about its axis against a constant braking torque applied to the pad, which apparatus comprises a base and, mounted on said base, two parallel non-rotatable cylindrical pins over the surfaces of which the tape may be drawn to generate frictionally a force tending to retard the passage of the tape, the base being rotatably adjustable about an axis extending parallel and in close proximity to the pins and the pins being so disposed that the tape may pass from the pad in one direction around one pin and from that pin in the opposite direction around the other pin, a dancer roller about which the tape passes after it leaves the pin assembly and, actuated by said dancer roller, a spring loaded control arrangement coupled to the pin base, whereby the arrangement is responsive to variations in the tension in the tape and in the spring loading and so controls the angular position of the pin base relative to a datum position that the aggregate arc of contact between the tape and the pins will be automatically adjusted to compensate for any variations tending to occur in the tension in the tape being drawn off from the pad.

2. Tension regulating apparatus as claimed in claim 2, wherein the spring loaded control arrangement also includes means for varying the torque exerted on the pin base by the control arrangement as it responds to variations in the tension in the tape by automatically modifying in a predetermined manner the value of the spring loading.

3. Apparatus for applying a retarding force to a tape being drawn from a pad which is mounted for rotation about its axis against a constant braking torque applied to the pad, which apparatus comprises a base and, mounted on said base, two parallel non-rotatable cylindrical pins over the surfaces of which the tape may be drawn to generate frictionally a force tending to retard the passage of the tape, the base being rotatably adjustable about an axis co-planar with and extending parallel to and midway between the axes of the pins and the pins being so disposed that the tape may pass from the pad in one direction around one pin and from that pin in the opposite direction around the other pin, and a spring loaded control arrangement which comprises a fixed roller around which the tape passes in one direction on leaving the pin assembly, an arm pivoted at one end about an axis parallel to the pin axes and geared at its other end to the pin base, spring means for exerting on the arm a torque in one sense and, mounted on the arm, a dancer roller around which the tape leaving the fixed roller passes in the opposite direction so that the tension in the tape exerts a torque on the arm in the opposite sense, the spring loaded arm pivoting in response to variations in the tension in the tape after it leaves the pin assembly and to variations in its spring loading so to control the angular position of the pin base relative to a datum position that the aggregate arc of contact between the tape and the pins will be automatically adjusted to compensate for any variations tending to occur in the tension in the tape being drawn off from the pad.

4. Tension regulating apparatus as claimed in claim 3, wherein the spring means exerting a torque on the pin base comprises at least one coil spring and wherein the spring loaded control arrangement also includes means for varying the torque exerted on the pin base by the control arrangement as it responds to variations in the tension in the tape by automatically modifying in a predetermined manner the value of the spring loading, said automatic modifying means comprising a cam and a cable assembly which couples the coil spring to the control arrangement and which is adapted to co-operate with the cam, said cam having such a profile that, for any angular movement of the pin base caused by movement of the dancer roller, the force exerted on the control arrangement by the coil spring results in correct angular adjustment of the pin base required to maintain the tension in the tape substantially constant irrespective of pad diameter.

5. Tension regulating apparatus as claimed in claim 4, wherein a control drum for initially pre-setting the tension in the coil spring of the control arrangement is connected to the cable assembly, a band brake is associated with the pad for applying the constant braking torque thereto, a separate coil spring is connected to the band of the brand brake and a separate cable assembly couples the coil spring of the brand brake to said control drum.

6. Tension regulating apparatus as claimed in claim 1, wherein a damping device is coupled to the control arrangement.

7. Tension regulating apparatus as claimed in claim 1, wherein a damping device is coupled to the pin base.

8. In machine for lapping tape helically about a longitudinally advancing core, comprising a revolving lapping head on which are mounted for rotation about their axes a plurality of pairs of pads of tape, tension regulating apparatus associated with each pad of at least one pair of pads for applying a retarding force to the tape being drawn from the pad against a constant braking torque applied to the pad, which apparatus comprises a base and, mounted on the base, two parallel non-rotatable cylindrical pins over the surfaces of which the tape may be drawn to generate frictionally a force tending to retard the passage of the tape, the base being rotatably adjustable about an axis extending parallel and in close proximity to the pins and the pins being so disposed that the tape may pass from the pad in one direction around one pin and from that pin in the opposite direction around the other pin, and a spring loaded control arrangement responsive to variations in the tension in the tape after it leaves the pin assembly and to variations in the spring loading so to control the angular position of the pin base relative to a datum position that the aggregate arc of contact between the tape and the pins will be automatically adjusted to compensate for any variations tending to occur in the tension in the tape being drawn off from the pad and being lapped helically about the advancing core.

9. In a machine for lapping tape helically about a longitudinaly advancing core, comprising a revolving lapping head on which are mounted for rotation about their axes a plurality of pairs of pads of tape, tension regulating apparatus associated with each pad of at lest one pair of pads for applying a retarding force to the tape being drawn from the pad against a constant torque applied to the pad, which apparatus comprises a base and, mounted on said base, two prallel non-rotatable cylindrical pins over the surfaces of which the tape may be drawn to generate frictionally a force tending to retard the passage of the tape, the base being rotatably adjustable about an axis coplanar with and extending parallel to and midway between the axes of the pins and the pins being so disposed that the tape may pass from the pad in one direction around one pin and from that pin in the opposite direction around the other pin, and a spring loaded control arrangement, coupled to the pin base and a dancer roller about which the tape passes after it leaves the pin assembly and which actuates the spring loaded control arrangement, the spring loaded control arrangement being responsive to variations in the tension in the tape after it leaves the pin assembly and to variations in the spring loading so to control the angular position of the pin base relative to a datum position that the aggregate arc of contact between the tape and the pins will be automatically adjusted to compensate for any variations tending to occur in the tension in the tape being drawn off from the pad and being lapped helically about the advancing core.

10. In a machine for lapping tape helically about a longitudinally advancing core, comprising a revolving lapping head on which are mounted for rotation about their axes a plurality of pairs of pads of tape, tension regulating apparatus associated with each pad of at least one pair of pads for applying a retarding force to the tape being drawn from the pad against a constant braking torque applied to the pad, which apparatus comprises a base and, mounted on said base, two parallel non-rotatable cylindrical pins over the surfaces of which the tape may be drawn to generate frictionaly a force tending to retard the passage of the tape, the base being rotatably adjustable about an axis co-planar with and extending parallel to and midway between the axes of the pins and the pins being so disposed that the tape may pass from the pad in one direction around one pin and from that pin in the opposite direction around the other pin, and a spring loaded control arrangement which comprises a fixed roller around which the tape passes in one direction on leaving the pin assembly, an arm pivoted at one end about an axis parallel to the pin axes and geared at its other end to the pin base, spring means for exerting on the arm a torque in one sense and, mounted on the arm, a dancer roller around which the tape leaving the fixed roller passes in the opposite direction so that the tension in the tape exerts a torque on the arm in the opposite sense, the spring loaded arm pivoting in response to variations in the tension in the tape after it leaves the pin assembly and to variations in its spring loading so to control the angular position of the pin base relative to a datum position that the aggregate arc of contact between the tape and the pins will be automatically adjusted to compensate for any variations tending to occur in the tension in the tape being drawn off from the pad.

11. In a machine for lapping tape helically about a longitudinally advancing core, comprising a revolving lapping head on which are mounted for rotation about their axes a plurality of pairs of pads of tape, the pads of each pair of pads being of similar tape of the same width, tension regulating apparatus associated with each pad of at least one pair of pads for applying a retarding force to the tape drawn from the pad against a constant braking torque applied to the pad, which apparatus comprises a base and, mounted on said base, two parallel non-rotatable cylindrical pins over the surfaces of which the tape may be drawn to generate frictionally a force rotatably adjustable about an axis co-planar with and extending parallel to and midway between the axes of the pins and the pins being so disposed that the tape may pass from the pad in one direction around one pin and from that pin in the opposite direction around the other pin, and a spring loaded control arrangement which comprises a fixed roller around which the tape passes in one direction on leaving the pin assembly, an arm pivoted at one end about an axis parallel to the pin axes and geared at its other end to the pin base, spring means comprising at least one coil spring for exerting on the arm a torque in one sense and, mounted on the arm, a dancer roller around which the tape leaving the fixed roller passes in the opposite direction so that the tension in the tape exerts a torque on the arm in the opposite sense, the spring loaded arm pivoting in response to variations in the tension in the tape after it leaves the pin assembly and to variations in its spring loading, and also means for varying the torque exerted on the pin base by the control arrangement as it responds to variations in the tape by automatically modifying in a predetermined manner the value of the spring loading, said automatic modifying means comprising a cam and cable assembly which couples the coil springs to the control arrangement and which is adapted to co-operate with the cam, said cam having a profile that, for any angular movement of the pin base caused by movement of the dancer roller, the force exerted on the control arrangement by the coil spring results in a correct angular adjustment of the pin base required to maintain the tension in the tape substantialy constant irrespective of pad diameter, the coil spring of the control arrangements of both pads of the pair of pads being connected to a single control drum by which the tension in the coil springs of the control arrangements of both pads may be simultaneously initially pre-set.

References Cited

UNITED STATES PATENTS 2,309,093   1/1943   Borden _____________ 156—465X

OTHER REFERENCES

Operating Instructions, RCA Photophone Soundhead MI-9001-A, p. 1.

BENJAMIN A. BORCHELT, Primary Examiner

T. H. WEBB, Assistant Examiner

U.S. Cl. X.R.

156—465; 242—75

UNITED STATES PATENT OFFICE
CERTIFICATE OF CORRECTION

Patent No. 3,556,904  Dated January 19, 1971

Inventor(s) Ronald Hinds

It is certified that error appears in the above-identified patent and that said Letters Patent are hereby corrected as shown below:

The equation in Column 5 should read as follows:

Since
$$T_1 = \frac{P}{R} \cdot T$$

then substituting for $T_1$ in equation (ii)

$$t = \left(\frac{P}{R} \cdot Tx + Tr\right)K + 2Ty$$

$$= T\left\{\left(\frac{Px}{R} + r\right)K + 2y\right\}$$

UNITED STATES PATENT OFFICE
CERTIFICATE OF CORRECTION  Page 2

Patent No. 3,556,904          Dated January 19, 1971

Inventor(s)  Ronald Hinds

It is certified that error appears in the above-identified patent and that said Letters Patent are hereby corrected as shown below:

In the Claims:

Claim 2, Column 8 Line 34 --claim 2-- should read --claim 1--. Claim 5, Column 9 Lines 20 and 21 --brand brake-- should read --band brake--. Claim 9, Column 9 Line 57 --lest-- should read --least--. Claim 9, Column 9 Line 59 --constant torque-- should read --constant braking torque--. Claim 11, Column 10 Line 49 --tape drawn-- should read --tape being drawn--. Claim 11, Column 1( Line 53 after the word --force-- insert the phrase --tending to retard the passage of the tape, the base being--.

Signed and sealed this 18th day of May 1971.

(SEAL)
Attest:

EDWARD M. FLETCHER, JR.        WILLIAM E. SCHUYLER, JR.
Attesting Officer              Commissioner of Patents